Sept. 4, 1956     E. R. BERGMANN     2,761,550
DUCKBILL SLEWING APPARATUS
Filed Sept. 2, 1953     3 Sheets-Sheet 1
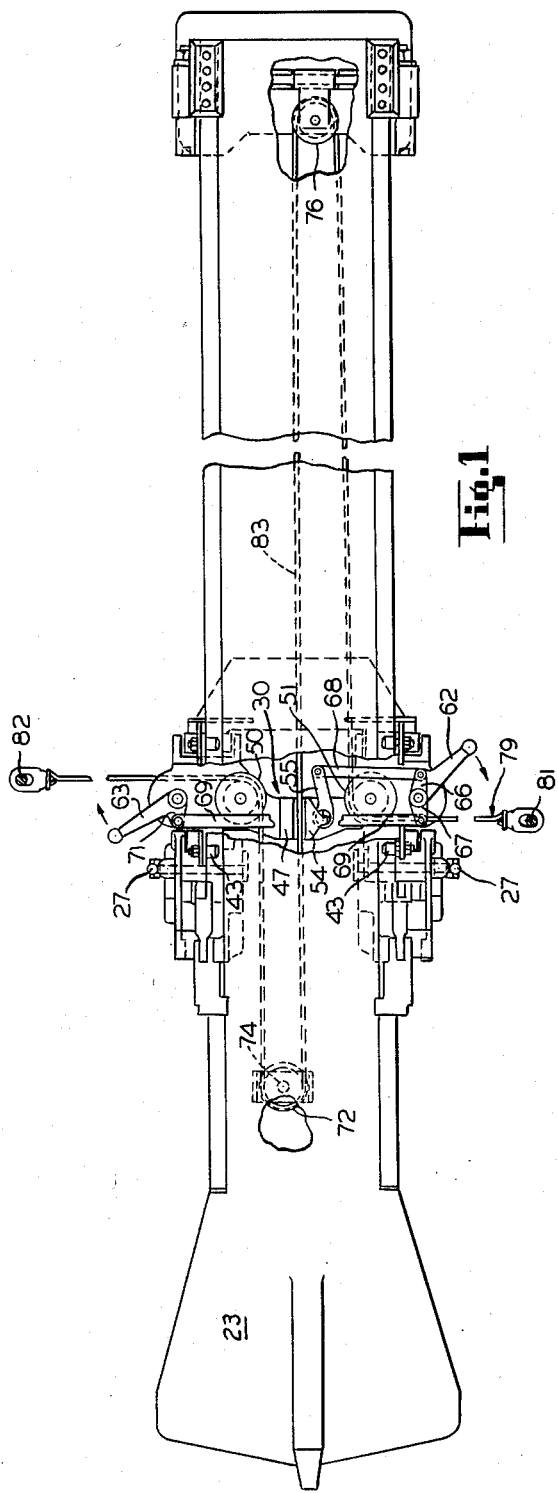
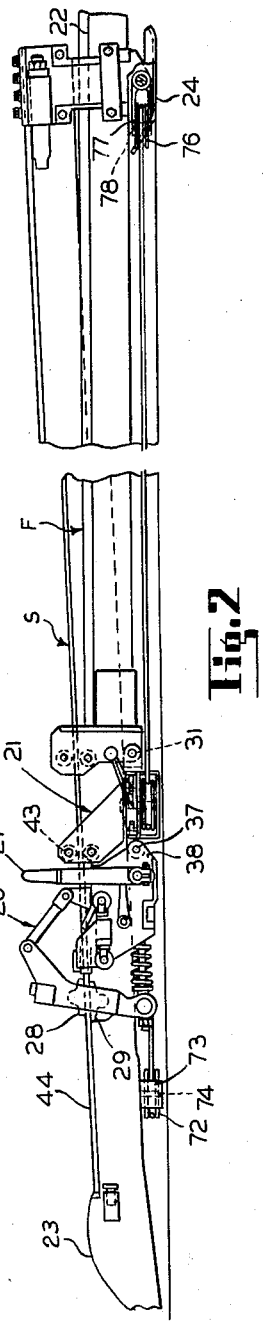
*INVENTOR.*
ERNST R. BERGMANN
BY
*Murray A. Gleeson*
ATTORNEY Sept. 4, 1956   E. R. BERGMANN   2,761,550
DUCKBILL SLEWING APPARATUS Filed Sept. 2, 1953   3 Sheets-Sheet 2

INVENTOR.
ERNST R. BERGMANN
BY
Murray A. Gleeson
ATTORNEY

Sept. 4, 1956 E. R. BERGMANN 2,761,550
DUCKBILL SLEWING APPARATUS
Filed Sept. 2, 1953 3 Sheets-Sheet 3
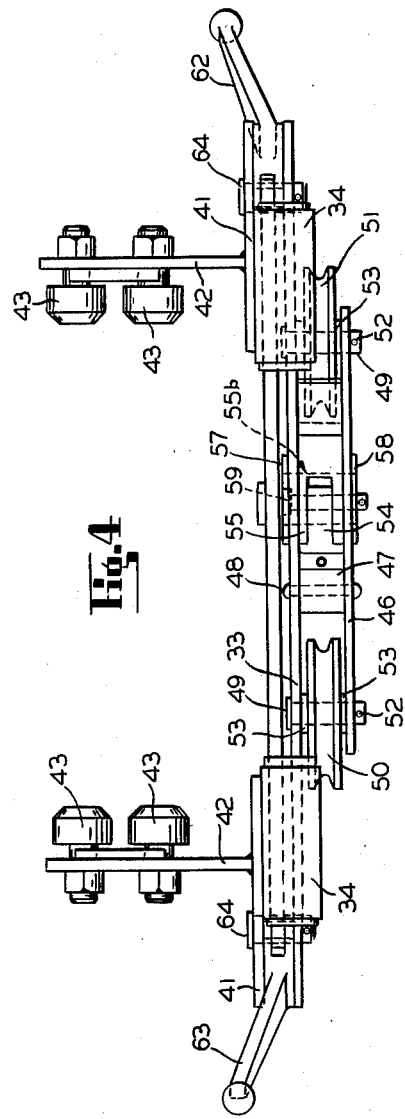
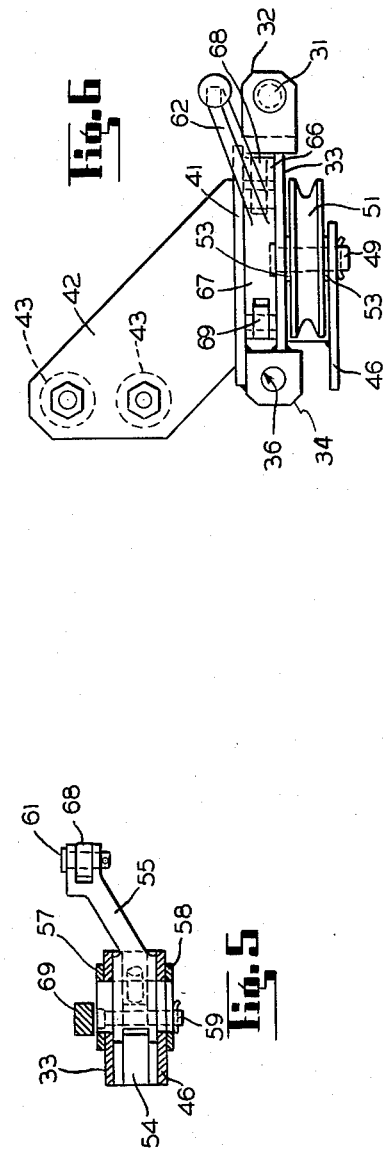
INVENTOR.
ERNST R. BERGMANN
BY
Murray A. Gleeson
ATTORNEY United States Patent Office 2,761,550
Patented Sept. 4, 1956

2,761,550

DUCKBILL SLEWING APPARATUS

Ernst R. Bergmann, Evergreen Park, Ill., assignor to Goodman Manufacturing Company, Chicago, Ill., a corporation of Illinois Application September 2, 1953, Serial No. 378,130

4 Claims. (Cl. 198—220)

This invention relates to mining equipment, especially shaker conveyor loading heads called "duckbills," and particularly to an improvement for slewing a duckbill in response to relative movement between the shovel and feeder troughs.

For the sake of those not skilled in this particular art, a shaker conveyor includes a number of individual troughs clamped together into a single line and reciprocably driven in such a manner that material is slid in one direction along it. When used in conveying material away from an advancing face in mining, the trough line may be progressively lengthened, by addition of troughs to a total of 600 or more feet. The loading head, or "duckbill," at the inbye end includes a "feeder trough" which is connected to the main line by a swivel trough permitting 40 degrees or more of swinging movement to the right or to the left while being reciprocably driven by the main line. A trough having a shovel engageable with material dislodged from the face, and called a "shovel trough," is telescopically mounted on the feeder trough. The reciprocation of the feeder trough is utilized to extend or retract the shovel trough into or out of the dislodged material by an arrangement of grip blocks acting in proper timed sequence between the feeder and shovel troughs, as shown in Sloane Patents 2,434,127 and 2,454,484.

In cleaning up a face, the duckbill will be progressively swung or "slewed" from one side to the other. The simplest means for slewing is a crowbar held under the shovel as it reciprocates but this requires some effort and takes a man who could be used more profitably doing something else. On the other hand there has been developed a completely mechanized slewing unit, called a "power duckbill" controllable at the press of a button by the regular duckbill operator, as shown in Sloane Patent 2,360,169 dated October 10, 1944, but having the disadvantages of costing several thousand dollars, weighing more than a ton, and being difficult to move from place to place.

It has been my object to provide a cheap, lightweight, dependable slewing apparatus representing a practical compromise between the crowbar and the heavy, expensive piece of machinery.

The present invention utilizes the relative motion between the feeder and shovel troughs during retraction and extension of the shovel trough. I know of only two previous instances where a slewing arrangement has utilized the above-mentioned relative motion between the feeder and shovel troughs. One is described in my pending patent application Serial No. 213,749, filed March 3, 1951, and now Patent No. 2,670,071, and the other is shown in Frye Patent 2,642,983. My invention is a great deal simpler than those two prior devices and it functions in a different manner: in the two prior devices the duckbill is slewed to the right and to the left in response to retracting movement of the shovel trough; while, in the present invention, it slews to the right on retraction of the shovel trough and to the left on extension, or vice versa.

Specifically, it is an object of the present invention to provide a duckbill slewing apparatus which, in one of its simple forms, includes only four sheaves, a single cable gripping means and a length of cable.

Other objects and advantages will be brought out in the following description taken in connection with the drawings in which:

Figure 1 is a plan view of a duckbill partly cut away to show one embodiment of the present invention;

Fig. 2 is a side view of Fig. 1;

Fig. 4 is a view of Fig. 3 taken along the line 4—4;

Fig. 5 is a sectional view of Fig. 3 taken along the line 5—5; and

Fig. 6 is a side view of Fig. 3 taken along the line 6—6.

Figure 3:
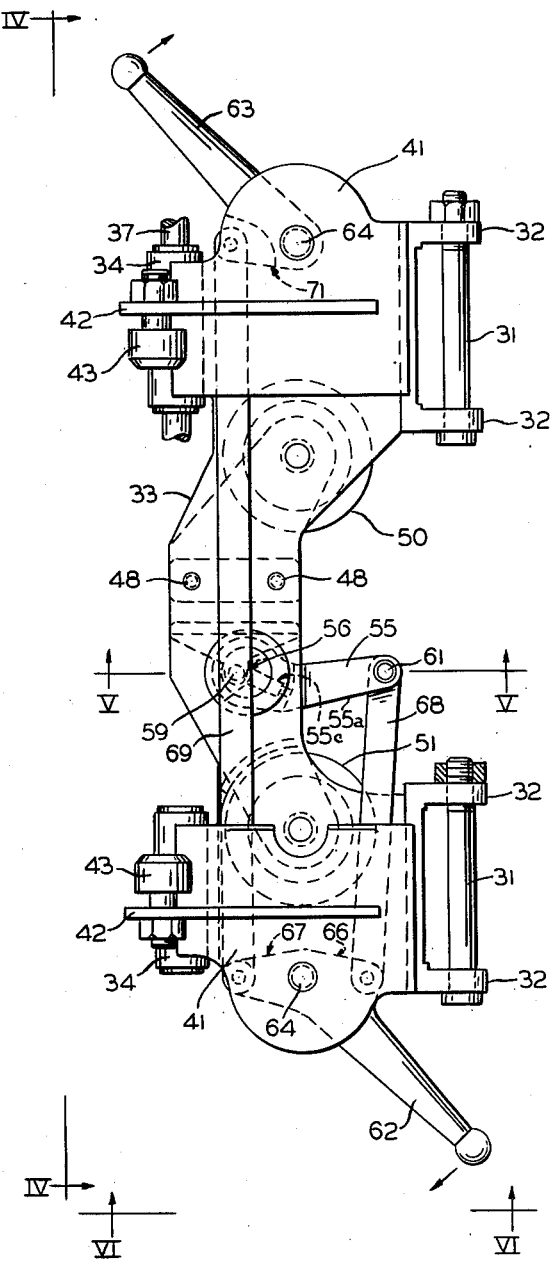
Fig. 3 is a plan view of the inbye end portion of the feeder trough showing the new parts which would be added to a conventional duckbill to convert to the present invention; this is also a view of Fig. 1 with certain parts removed.

Referring now to the drawings, the duckbill includes a feeder trough F terminating in an inbye portion 21 and having an outbye portion 22 connected in the usual manner to a swivel trough (not shown).

A shovel trough S has a shovel formation 23 at its inbye end and a shoe 24 at its outbye end. The duckbill is supported on the ground by contact made with these shovel and shoe portions.

Manually controlled grip block means 26, controlled by handles 27, 27, is also carried by the inbye portion of the feeder trough, ahead of the section 21. The grip block means 26 will not be described further here as it has been disclosed in great detail in the above-mentioned Patents 2,434,127 and 2,454,484. Briefly, however, it will be explained that it comprises the operating connection between the feeder and shovel troughs and, when the handles 27, 27 are pushed in an inbye direction, a set of four grip blocks 28, 29 (two on each side) lock the two troughs together on the forward stroke of the feeder trough, and release the grip blocks on the rearward or outbye stroke of the feeder trough so that the shovel trough is progressively fed toward the face on successive forward strokes. By moving the operating handles 27, 27 in an outbye direction, the grip blocks 28, 29 are caused to grip only in an outbye direction so that the shovel trough is retracted.

As shown in Figs. 1 and 2, there is a transverse, horizontal pivot pin 31 on each side connecting the rear of the section 21 to the main part of the feeder trough. As shown in Fig. 3, each pin 31 is engaged in a pair of ears 32, 32, one pair on each side of the section 21. A plate 33 is welded to the ears 32 and also has a pair of corresponding bearing members 34, 34 on the front portion, each provided with a bore 36 (Fig. 6) for receiving a pin 37 (Fig. 2) engaged with ears 38, 38 on the grip block means 26. In this particular case the ears 38, 38 are identical to those designated 32, 32.

At each side of the section 21 is a lesser, horizontal plate 41, welded to the top sides of ears 32 and bearing members 34. Atop each of the plates 41 is an upstanding plate 42 for a pair of vertically spaced rollers 43, 43 engageable with the side rails 44 of the shovel trough so as to stabilize the section 21.

Another horizontal plate 46 is provided along the bottom of section 21, being held in spaced relation to the main plate 33 by means of an intermediate block or shoe 47 and rivets 48, 48. As will be seen, the block 47 is part of a cable gripping means generally designated 30.

As part of the present invention, the inbye end portion of the feeder trough carries a pair of sheaves 50, 51 between the plates 33 and 46 of section 21. Each of these sheaves is rotatably journaled on a pin 49, held in place by a cutter key 52. Spacing washers 53, 53 maintain the sheaves intermediate the plates 33 and 46.

The cable gripping means 30 will now be described. Between the plates 33 and 46 is a movable shoe 54 which is movable toward and away from the stationary shoe 47 by means of a lever 55. The details of the shoe and lever will not be described minutely inasmuch as any arrangement which moves the shoe in response to movement of the lever will suffice. Briefly, however, the lever 55 comprises the following pieces: the elongated lever proper 55a; and the large vertical pivot pin 55b; both held together to form a unitary assembly swingable about the center 56 (Fig. 3) by locking pin 55c. To support the lever assembly 55, annular weldments 57, 58 are provided to strengthen the plates 33, 46 respectively. The lever assembly is bifurcated, as best shown in Fig. 4, to permit reception of the back end portion of the movable block 54, and a vertical through-pin 59, disposed eccentrically in the pivot pin 55b, provides the pivotal connection between the movable block and the lever.

Thus, briefly, the lever 55 is pivotable about the point 56. Beyond that point, at 59, the movable block is carried. Mechanical advantage, in moving the block, is obtained in the ratio of the length of the major arm (between points 56 and 61) and the minor arm (between points 56 and 59).

Manually operable control means, for the cable gripping means include a pair of handle 62, 63, operable by a man on either side of the duckbill. Each operating handle is pivotable on a pivot pin 64 extending between one of plates 41 and plate 33. Handle 62 has two arms 66 and 67. Arm 66 is connected through a link 68 to the lever 55. And 67 is connected through a link 69 to the single arm 71 of control handle 63. Thus, it will be seen that by moving either handle in the direction indicated by the arrows (clockwise, Figs. 1 and 3) the movable block 54 of the gripping means will be moved toward the block 47 to grip the cable (yet to be described) therebetween.

At the inbye end portion of the shovel trough, near the shovel, a sheave 72 is mounted in any suitable manner, for example, by the bracket 73 on the underside of the shovel, rotatably journaled about a vertical pin 74 carried by the bracket. At the outbye end portion of the shovel trough, atop the sliding shoe 24 in the present case, is a sheave 76 carried in a bracket 77 and rotatable about a vertical pin 78.

A cable 79 having opposite end portions anchored by jacks 81, 82 spaced from each side of the troughs, is provided to pull or slew the duckbill from one side to the other. The end portions of the cable are trained about sheaves 50, 51 so as to direct the cable end portions respectively to sheaves 72, 76 carried by the opposite end portions of the shovel trough. These cable end portions then meet in an intermediate portion 83 which passes through the cable gripping means 30.

Normally, in operation of the duckbill to advance and retract the shovel trough, the cable gripping means 30 is in its released condition so the intermediate cable portion 83 can slip freely through it.

To slew the duckbill in one direction or the other, the cable gripping means 30 is first applied by moving either operating handle 62, 63 in a clockwise direction as indicated by the arrows.

Then, slewing to the right is accomplished by moving one of the handles 27 in a forward direction to extend the shovel trough. As the shovel trough extends, it lengthens the cable between sheaves 72 and 50, thereby shortening the distance between sheave 50 and jack 82 so as to pull the duckbill to the right; to provide the needed slack on the left side, the distance between sheaves 76 and 51 will decrease and the distance between sheave 51 and jack 81 will increase correspondingly.

Slewing to the left is accomplished by pulling one of the handles 27 backward, while the cable gripping means 30 is locked, to retract the shovel trough. This lengthens the distance between sheaves 76 and 51 and shortens the distance between sheave 51 and jack 81, thereby pulling the duckbill to the left; the required slack is provided in the right end portion of the cable by shortening of the distance between sheaves 72 and 50 and correspondingly lengthening of the part of the cable between the sheave 50 and jack 82.

Inherent in the arrangement shown is a two-to-one ratio between the magnitude of the slewing movement and the retracting or extending movements of the shovel trough. Thus, for every six inches of retracting or extending movement of the shovel trough, the inbye end portion of the feeder trough is slewed twelve inches and the shovel 23 itself, being farther away from the swivel trough (not shown) will be slewed an amount greater than twelve inches depending on how far it happens to be extended at the time.

While a particular embodiment of the present invention has been shown for illustrative purposes only, it will be understood that the invention is not limited to the specific details disclosed, since many modifications may be made. It is therefore contemplated by the appended claims to cover any such modifications as fall within the true spirit and scope of the invention.

I claim:

1. In a device for slewing a duckbill including a shovel trough telescopically supported on a feeder trough pivotally connected to an end of a reciprocable shaker conveyor line, and means for extending and retracting the shovel trough relative to the feeder trough, the improvement comprising: sheaves at opposite end portions of said shovel trough; sheaves at opposite side portions of the inbye end portion of said feeder trough; a cable having each of its end portions anchored at a point spaced from one side of the troughs and trained around one of said feeder trough sheaves and thence around one of said shovel trough sheaves and meeting the opposite cable end portion between said shovel trough sheaves; each of said cable end portions being oppositely trained about said feeder trough sheaves so as to extend respectively inbye and outbye of said feeder trough inbye end portion toward said sheaves at opposite end portions of the shovel trough; and a single cable gripping means mounted on the inbye end portion of the feeder trough and operable during slewing to grip a portion of the cable between the shovel trough sheaves whereby the duckbill will be slewed in one direction or the other responsive to retraction or extension of the shovel trough.

2. In a device for slewing a duckbill including a shovel trough telescopically supported on a feeder trough pivotally connected to an end of a reciprocable shaker conveyor line, and means for extending and retracting the shovel trough relative to the feeder trough, the improvement comprising: a first sheave carried on the inbye end portion of the feeder trough; second and third sheaves carried by the shovel trough and disposed inbye and outbye of said first sheave; a fourth sheave carried on the inbye end portion of the feeder trough; cable gripping means carried on the inbye end portion of said feeder trough; and cable means extending respectively from an anchored position spaced from one side of said troughs, around said first and second sheaves, through said gripping means, around said third and fourth sheaves, and thence to an anchored position spaced from the opposite side of said troughs; and means for operating the cable gripping means during slewing, whereby the duckbill will be slewed in one direction or the other responsive to retraction or extension of the shovel trough.

3. In a device for slewing a duckbill including a shovel trough telescopically supported on a feeder trough pivotally connected to an end of a reciprocable shaker conveyor line, and means for extending and retracting the shovel trough relative to the feeder trough, the improvement comprising: a pair of sheaves and a cable gripping means carried on the inbye end portion of the feeder trough; another pair of sheaves carried by the shovel trough and disposed respectively inbye and outbye of said feeder trough inbye end portion; cable means anchored at points spaced from each side of the troughs, each end portion of said cable being trained about one of the feeder trough sheaves and thence to one of the inbye and outbye shovel trough sheaves and thence to an intermediate portion of the cable which passes through said gripping means; and means for operating the cable gripping means during slewing, whereby the duckbill will be slewed in one direction or the other responsive to retraction or extension of the shovel trough.

4. In a device for slewing a duckbill including a shovel trough telescopically supported on a feeder trough pivotally connected to an end of a reciprocable shaker conveyor line, and means for extending and retracting the shovel trough relative to the feeder trough, the improvement comprising: cable means having opposite end portions anchored at points spaced from each side of the troughs, said end portions of said cable being trained about direction-changing members carried by the inbye end of the feeder trough which direct said cable end portions respectively to other direction-changing members carried respectively on inbye and outbye end portions of the shovel trough, said cable having an intermediate portion extending between said other direction-changing members, said intermediate portion being engageable by cable gripping means carried by said feeder trough adjacent the direction-changing members on the latter, and means for operating the cable gripping means during slewing, whereby the duckbill will be slewed in one direction or the other responsive to retraction or extension of the shovel trough.

References Cited in the file of this patent

UNITED STATES PATENTS

| | | |
|---|---|---|
| 2,237,470 | Bergmann | Apr. 8, 1941 |
| 2,642,983 | Frye | June 23, 1953 |